United States Patent [19]

Roseliep

[11] Patent Number: 5,352,068
[45] Date of Patent: Oct. 4, 1994

[54] BROACH APPARATUS

[75] Inventor: Robert E. Roseliep, Grosse Pointe, Mich.

[73] Assignee: Utica Enterprises, Inc., Shelby Township, Oceana County, Mich.

[21] Appl. No.: 14,648

[22] Filed: Feb. 8, 1993

[51] Int. Cl.$^5$ .............................................. B23D 43/04
[52] U.S. Cl. .......................................... 407/15; 407/18
[58] Field of Search .................. 407/14, 15, 16, 17, 407/18, 19; 29/79, 80

[56] References Cited

U.S. PATENT DOCUMENTS

| | | | |
|---|---|---|---|
| 735,825 | 8/1903 | Rohret | 29/79 |
| 1,692,977 | 11/1928 | De Voe et al. | 407/15 |
| 1,806,552 | 5/1931 | Atwood | 407/16 |
| 1,935,774 | 11/1933 | Halborg | 407/16 |
| 2,525,098 | 10/1950 | Hougland | 407/14 |
| 3,484,918 | 12/1969 | Bentham | 29/79 |
| 3,618,187 | 11/1971 | Jensen | 29/79 |
| 3,656,220 | 4/1972 | Dupuis | 407/17 |

FOREIGN PATENT DOCUMENTS

| | | | |
|---|---|---|---|
| 2547320 | 4/1977 | Fed. Rep. of Germany | 407/15 |
| 22248 | 5/1921 | France | 407/16 |
| 671990 | 12/1929 | France | 29/79 |
| 443730 | 4/1975 | U.S.S.R. | 407/15 |
| 1359082 | 12/1987 | U.S.S.R. | 407/15 |
| 414331 | of 1934 | United Kingdom | 407/16 |

Primary Examiner—William E. Terrell
Attorney, Agent, or Firm—Remy J. VanOphem

[57] ABSTRACT

A shell-type internal broach assembly including a number of annular insert mounting shells interleaved with a number of annular spacers, and mounted on an arbor. The annular insert mounting shells are sufficiently short so as to permit the use of travelling-wire EDM manufacturing methods. As a result, inserts can be precisely and accurately located and secured to the annular insert mounting shells, thereby presenting a highly repeatable broaching configuration to a workpiece. The precision by which the annular insert mounting shells are formed also promotes concentricity of the annular insert mounting shells, which further promotes the accurate and precise placement of the inserts relative to the longitudinal axis of the arbor. The use of the annular spacers also effectively reduces the cost of the internal broach assembly, in that the simple cylindrical outer surface of the annular spacers are less expensive to manufacture than the complex surface features necessary to accurately receive the inserts on the periphery of the annular insert mounting shells. The number and length of the annular spacers used can be varied in accordance with the strength required by the inserts to resist deformation by the cutting forces.

18 Claims, 3 Drawing Sheets

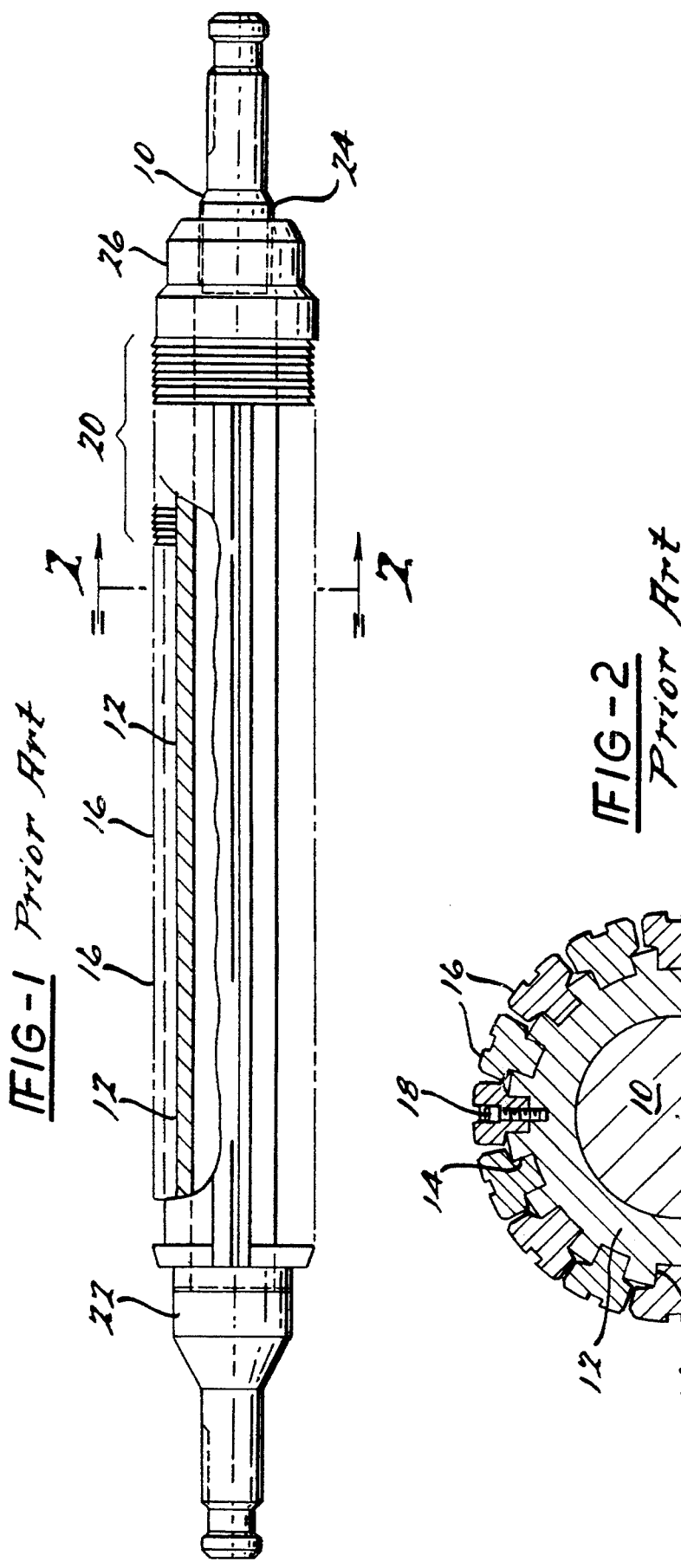
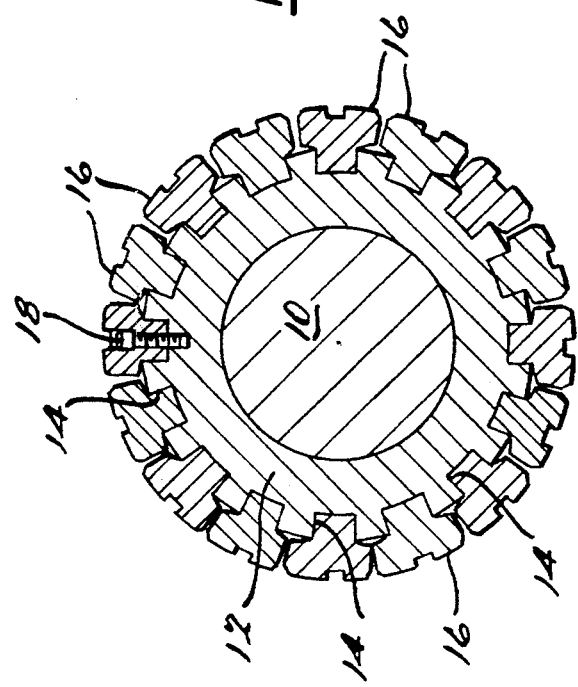

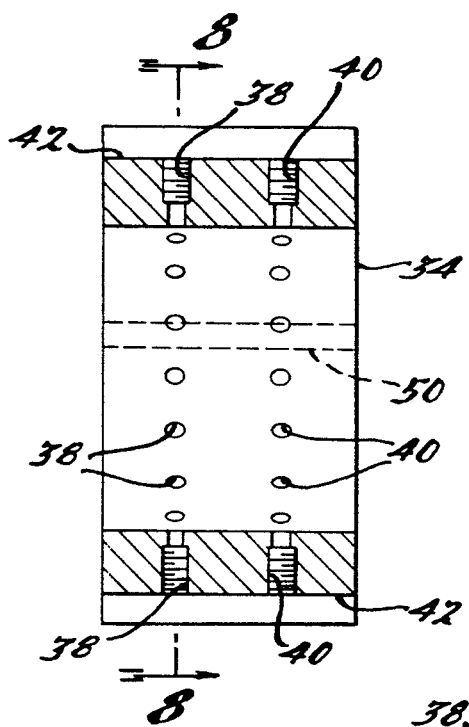
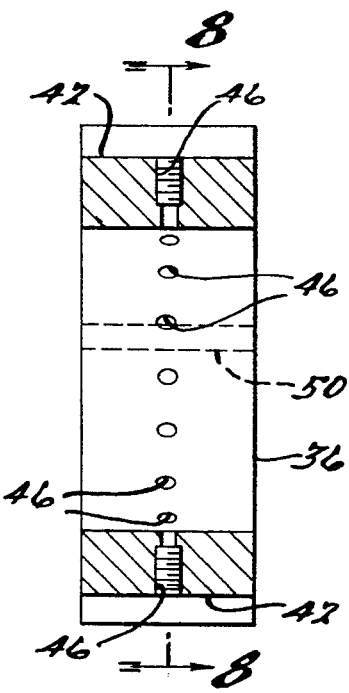
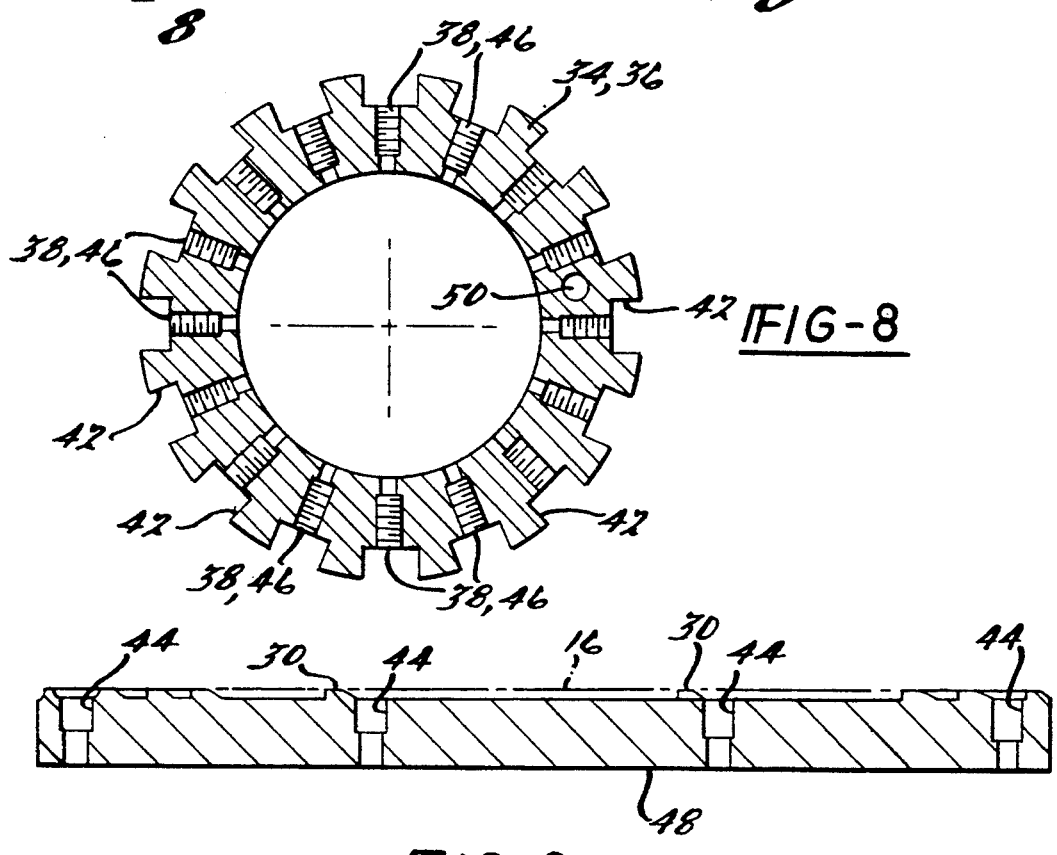

BROACH APPARATUS

BACKGROUND OF THE INVENTION

1. Field of the Invention

The present invention generally relates to broaching machinery, such as the type used to broach large diameter internal shapes, which includes an arbor with slots or the like formed in its outer surface or in a shell fitted over the arbor for receiving a number of broaching inserts. More specifically, this invention relates to such a broach apparatus wherein the slots are precision formed in a number of annular members whose axial lengths are sufficiently short to permit manufacture of the annular members by electrical discharge machining (EDM) technologies, so as to result in a more accurate and highly repeatable placement of the inserts relative to the arbor and, therefore, relative to a workpiece.

2. Description of the Prior Art

Various types of internal shape-type broaches have been developed over the years for the purpose of machining splines and various other forms on workpieces whose configurations permit a broach to be passed completely through the workpiece. Early forms of such broaches include solid broaches formed from one-piece bar stock, which typically have a number of integrally-formed teeth. More recently, shell internal broaches have been developed, which differ from solid broaches in that they include teeth formed on, or inserts mounted to, a removable shell secured on an arbor. Shell internal broaches are superior to solid broaches with respect to the ability to replace only the shell instead of the entire broach when the teeth or inserts are worn or damaged. However, solid broaches are generally able to provide greater dimensional accuracy and concentricity than shell internal broaches, due to normal dimensional variations being compounded by the additional number of pieces required for shell internal broaches.

A conventional shell internal broach is shown in FIGS. 1 and 2. Generally, one or more tubular-shaped shells 12 are mounted on an arbor 10 so as to abut an enlarged portion 22 at one end of the arbor. The shells 12 are secured to the arbor 10 with a nut 26 threaded onto a threaded portion 24 located at an end of the arbor 10 opposite the enlarged portion 22. Each shell 12 serves to secure a set of broaching inserts 16 on their periphery, such that each set of broaching inserts 16 is separately mounted to the arbor 10. Accordingly, the ability to remove one of the shells 12 and replace it with another having new or reground broaching inserts 16, which are of a different diameter and/or a different configuration, provides a versatility which is not possible with solid broaches.

The broaching inserts 16 are received in a corresponding number of ground slots 14 or other precision manufactured shapes formed in the peripheral surface of the shells 12. The broaching inserts 16 may be secured in the slots 14 with fasteners, such as the bolts 18 shown or locking wedges (not shown), as is known in the art. Preferably, a series of shaving rings 20 are also mounted on the arbor 10 behind the broaching inserts 16, such that the shaving rings 20 perform work on a workpiece after the broaching inserts 16 have completed their work, so as to remove errors of form introduced into the workpiece by the broaching inserts 16.

As noted above, shell internal broaches of the type shown in FIGS. 1 and 2 have a significant shortcoming in that dimensional accuracy and concentricity are less than that of solid broaches as a result of their additional number of components. This is true even though precision machining and grinding operations are employed to form the slots 14 on the shells 12. Because of this, shell internal broaches constructed in accordance with the prior art are relatively expensive to manufacture, due to the additional, expensive and time-consuming manufacturing operations required to sufficiently achieve the precision desired of the shells 12 and slots 14. The costs associated with shell internal broaches are further increased by expenses incurred in their maintenance, such as the need to regrind the shells 12 and slots 14 as they become worn or damaged.

Further, the machining and/or grinding operations necessitated by the shell internal broaches taught in the prior art do not lend themselves to existing automated or numerically-controlled machining technologies, such as electrical discharge machining (EDM) technologies, and in particular, travelling-wire EDM technologies. Travelling-wire EDM is a highly desirable manufacturing method in that accuracies of about ±0.013 mm (±0.0005 inches) are readily achievable, with accuracies of better than about ±0.005 mm (±0.0002 inches) being possible. However, the shells 12 used by the prior art are prohibitively long to permit the use of travelling-wire EDM technologies. As a result, the shells 12 and slots 14 must typically be ground to size, which is generally less precise than travelling-wire EDM.

Accordingly, what is needed is an internal broach apparatus which is capable of dimensional accuracies and concentricities comparable to that of solid broaches, yet retains the versatility and interchangeability of shell internal broaches. It would also be desirable that such an internal broach provide reduced manufacturing and maintenance costs, as compared to prior art shell internal broaches, while permitting the use of modern machining technologies, such as numerically-controlled travelling-wire EDM operations.

SUMMARY OF THE INVENTION

According to the present invention there is provided a shell-type internal broach assembly which includes a number of annular shells which are significantly shorter than that taught by the prior art. As a result, the annular shells can be manufactured using travelling-wire EDM technologies. The annular shells are interleaved with a number of annular spacers and mounted on an arbor. The annular shells are precision-formed so as to accurately locate broaching inserts secured thereto, and thereby present a highly repeatable broaching configuration to a workpiece. The precision by which the annular shells can be formed with travelling-wire EDM permits the annular shells to be spaced apart by the annular spacers along the length of the arbor, while maintaining concentricity of the annular shells and accuracy by which the inserts are located relative to the longitudinal axis of the arbor.

Each of the annular shells of this invention have at least one receptacle formed on its periphery. The annular shells are then aligned on the arbor so as to align each of the receptacles, which together define a segmented elongate slot extending substantially longitudinally along the length of the arbor. The annular spacers are mounted on the arbor such that at least one of the annular spacers is disposed between at least one adjacent pair of annular shells. The outer diameter of the annular spacers is less than the outer diameter of the annular shells when measured at the receptacle, such that the elongate slot is segmented but not interrupted by the annular spacers. Each of the annular shells and annular spacers are retained on the arbor by a suitable device, such as a nut threadably mounted on the arbor.

In a preferred embodiment, the inserts are elongate, such that two inserts, placed end to end, will fill the entire length of the elongate slot formed by the aligned receptacles in the annular shells. The number and axial spacing of the annular shells on the arbor determines the length of the segmented elongate slot, while the number of segmented elongate slots determines the number of inserts which the annular shells are capable of supporting.

According to a preferred aspect of this invention, the precision by which the annular shells are manufactured is significantly improved through the use of travelling-wire EDM technologies. As a result, the precision, accuracy and repeatability by which the receptacles are formed in the annular shells, as well as the concentricity of the annular shells, are significantly improved. Consequently, the shell broaching apparatus of this invention is capable of presenting a highly repeatable broaching configuration to a workpiece.

In addition, the shell broaching apparatus of this invention retains the aforementioned advantages associated with shell broaches, namely, interchangeability and versatility to allow the annular shells to be readily replaced with other annular shells having a different diameter and/or configuration.

Another significant advantage of this invention is that the use of the annular spacers effectively reduces the cost of the shell internal broach apparatus, in that the simple cylindrical outer surface of the annular spacers are less expensive to manufacture than the complex surface features necessary to accurately receive the inserts on the periphery of the annular shells. Furthermore, the number and length of the annular spacers used may be varied in accordance with the strength required by the inserts to resist deformation by the cutting forces. The annular spacers also facilitate chip removal during the operation of the shell internal broach apparatus, in that the space provided by the annular spacers between adjacent annular shells can accommodate the chips and swarf generated by the broaching process.

Accordingly, it is an object of the present invention to provide a broaching apparatus whose construction promotes the dimensional precision of the broaching apparatus, so as to enable the broaching apparatus to present a highly repeatable broaching configuration to a workpiece.

It is a further object of the invention that the broaching apparatus be a shell-type internal broaching apparatus having a number of annular insert mounting shells, each of which are readily removable from an arbor to permit replacement with other annular insert mounting shells.

It is still a further object of the invention that the broaching apparatus include a number of annular spacers positioned between adjacent pairs of annular insert mounting shells.

It is another object of the invention that the broaching apparatus enable the use of automated or numerically-controlled travelling-wire EDM technologies, which promote the precision, accuracy and repeatability by which the insert receptacles are formed in the annular insert mounting shells, as well as the concentricity of the annular insert mounting shells.

It is yet another object of the invention that the number and length of the annular spacers may be varied to meet the strength required by the inserts in order to resist deformation by the cutting forces.

Other objects and advantages of this invention will become more apparent after a reading of the following detailed description taken in conjunction with the drawings provided.

BRIEF DESCRIPTION OF THE DRAWINGS

FIG. 1 is a side view of a shell internal broaching assembly known in the prior art;

FIG. 2 is a transverse cross-sectional view taken along line 2—2 of FIG. 1;

FIG. 6 is a cross-sectional view of an annular insert mounting shell used to support an end of a broaching insert;

FIG. 7 is a cross-sectional view of an annular insert mounting shell used to support an intermediate portion of a broaching insert;

FIG. 8 is a cross-sectional side view taken along line 8—8 of both FIGS. 6 and 7; and FIG. 9 is a side view of a broaching insert.

DETAILED DESCRIPTION OF THE PREFERRED EMBODIMENT

Figure 3:
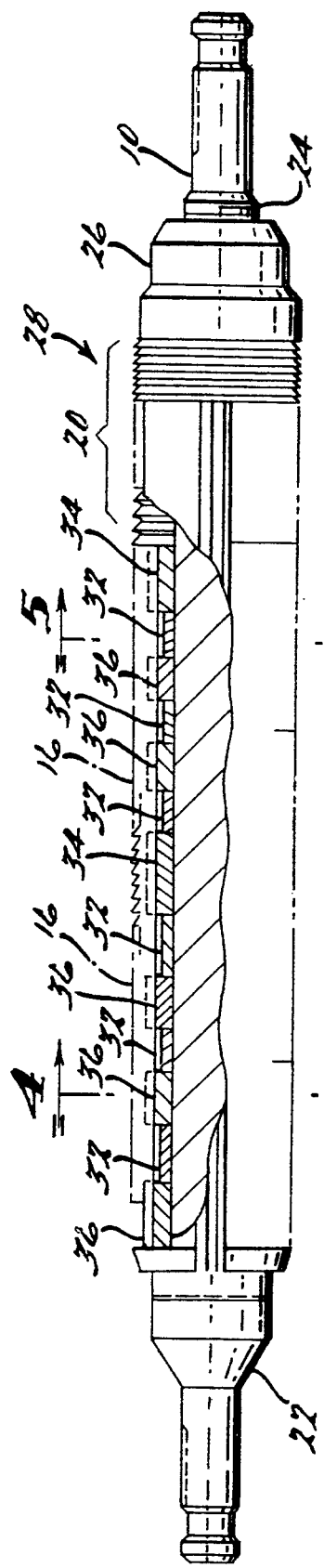
FIG. 3 is a partial cross-sectional side view of a shell internal broaching assembly constructed in accordance with a preferred embodiment of this invention.
Figure 5:
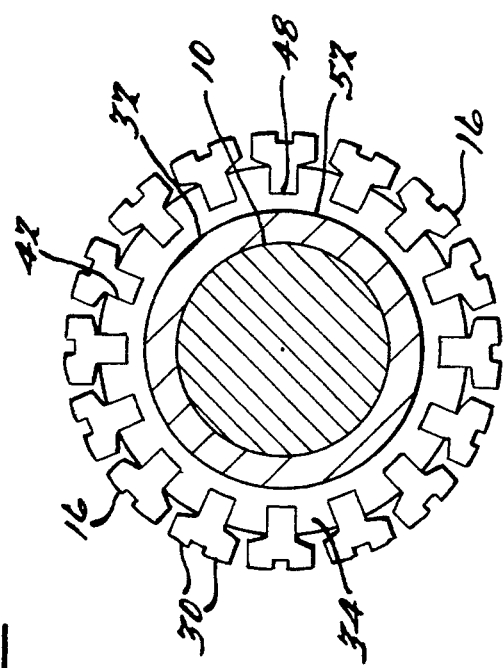
FIG. 5 is a cross-sectional view taken along line 5—5 of FIG. 3.
Figure 4:
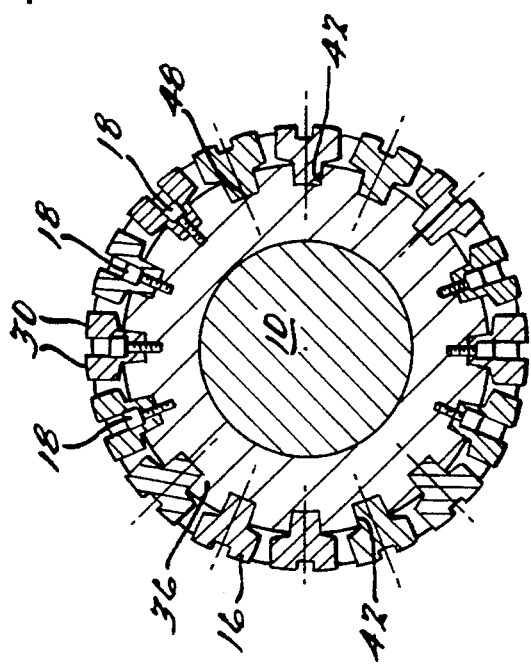
FIG. 4 is a cross-sectional view taken along line 4—4 of FIG. 3.

With reference to FIG. 3, there is shown in partial cross-section a side view of a shell internal broach assembly 28 in accordance with a preferred embodiment of this invention, with various features of the shell internal broach assembly 28 being illustrated in FIGS. 4 through 9. As illustrated, the shell internal broach assembly 28 includes a pulling arbor 10 which is substantially similar to the arbor 10 shown in FIGS. 1 and 2 of the prior art. In contrast to the prior art shell internal broach assembly illustrated in FIGS. 1 and 2, the shell internal broach assembly 28 of this invention has a number of annular-shaped insert mounting shells which are formed to receive a number of broaching inserts 16, as shown in FIGS. 3 through 5.

The annular insert mounting shells are composed of a set of end annular shells 34, as shown in FIG. 6, and a set of intermediate annular shells 36, as shown in FIG. 7. As best seen in FIG. 8, the end annular shells 34 and the intermediate annular shells 36 have the same cross-sectional configuration. The end annular shells 34 and the intermediate annular shells 36 have formed in their respective peripheries an identical number of slots 42. In accordance with this invention, the intermediate annular shells 36 and the end annular shells 34 are annular-shaped, having an axial length which is less than their outer diameters. Because of their shorter axial lengths, the end annular shells 34 and the intermediate annular shells 36 can be machined using electronically-controlled machining equipment, such as numerical controlled (NC) EDM equipment (not shown), and more preferably, travelling-wire EDM equipment. Such technologies are within the scope of those skilled in the art, and will not be described in further detail.

By using travelling-wire EDM manufacturing methods, the profiles of the end and intermediate annular shells 34 and 36 can be more accurately produced with higher repeatability, so as to provide a more accurate and precise placement of the broaching inserts 16 relative to the pulling arbor 10. In addition, travelling-wire EDM methods can be used to form precisely-located alignment holes 50 in the end and intermediate annular shells 34 and 36. The alignment holes 50 are used during assembly of the shell internal broach assembly 28 to axially align the end annular shells 34 and the intermediate annular shells 36 relative to each other on the pulling arbor 10.

When properly aligned with each other, the slots 42 in the end annular shells 34 and the intermediate annular shells 36 define a corresponding number of segmented elongate slots extending along the axial length of the pulling arbor 10. Each of the segmented elongate slots is sized to accommodate at least one broaching insert 16, as shown in FIGS. 4, 5 and 9. The broaching inserts 16 have lower portions 48 receivable in the slots 42 of the end and intermediate annular shells 34 and 36, such that a number of cutters 30 project radially from the end and intermediate annular shells 34 and 36, as seen in FIGS. 4 and 5.

In a preferred embodiment, each of the segmented elongate slots are sufficiently long so as to accommodate two broaching inserts 16 which are elongate and lying end to end, as shown in FIG. 3. Accordingly, the shell internal broach assembly 28 is apportioned into two broaching sections. Each broaching insert 16 provides a gradual but continuous taper to the broaching configuration diameter defined by the radially outward edge of diametrically-opposed broaching inserts 16. While it is preferred that the broaching inserts 16 be elongate for practicing this invention, it is foreseeable that one skilled in the art could greatly vary the size and length of the broaching inserts.

As seen in FIGS. 6 and 7, the end annular shells 34 are substantially wider than the intermediate annular shells 36 so as to accommodate two threaded bores 38 and 40 provided at the bottom of each slot 42, while a single threaded bore 46 is formed in the bottom of each slot 42 in the intermediate annular shells 36. Each of the threaded bores 38, 40 and 46 receives a threaded fastener, such as the bolts 18 shown in FIG. 4.

Each broaching insert 16 has a plurality of mounting bores, such as the four countersunk mounting bores 44 shown in FIG. 9. One countersunk mounting bore 44 is provided at each end of the broaching insert 16, while other mounting bores 44 are located at equally spaced intermediate locations as shown. Two bolts 18 secure the ends of each broaching insert 16 to a corresponding end annular shell 34 through the corresponding pair of the countersunk mounting bores 44, while additional bolts 18 secure intermediate portions of each broaching insert 16 to an appropriate number of intermediate annular shells 36, two as illustrated, through corresponding countersunk mounting bores 44. The combination of spacing the countersunk mounting bores 44 on the broaching inserts 16 and the short axial lengths of the end and intermediate annular shells 34 and 36 results in the end and intermediate annular shells 34 and 36 being axially spaced apart along the length of the pulling arbor 10. Those skilled in the art will recognize that the amount of intermediate support required for the broaching inserts 16 will depend on the length of the broaching inserts 16 and the deformation loads imposed by the broaching operation. Accordingly, fewer or more intermediate annular shells 36 may be required to sufficiently support the intermediate portions of the broaching inserts 16.

Annular spacers 32, shown in cross-section in FIG. 5, are sized to have an axial length which allows the annular spacers 32 to fit between adjacent end and intermediate annular shells 34 and 36. The outer surface 52 of the annular spacers 32 has an outer diameter which is slightly less than the diameter defined between the bottom of diametrically-opposed slots 42 on the end and intermediate annular shells 34 and 36. Because the outer surface 52 of the annular spacers 32 is spaced radially inward from the lower portion 48 of the broaching inserts 16 and, therefore, does not interfere with the broaching inserts 16 when mounted in the slots 42, no critical or precision grinding or machining is required to fabricate the outer surfaces of the annular spacers 32.

In addition to the above, the shell internal broach assembly 28 of this invention may include a number of shaving rings 20, as taught by the prior art. To lock the end and intermediate annular shells 34 and 36 and the shaving rings 20 on the pulling arbor 10, the shell internal broach assembly 28 conventionally will also include a nut 26 or other suitable device which is threadably received on a threaded portion 24 of the pulling arbor 10. Generally, the end and intermediate annular shells 34 and 36 will be mounted on the pulling arbor 10 such that the first end annular shell 34 will abut an enlarged portion 22 at an end of the pulling arbor 10 opposite the nut 26, as shown in FIG. 3.

From the above, it can be seen that a significant advantage of the shell internal broach assembly of this invention is that the substantially shorter axial lengths of the end and intermediate annular shells 34 and 36 permit their manufacture using precision manufacturing techniques, such as travelling-wire EDM technologies. As a result, the precision, accuracy and repeatability by which the slots 42 are formed in the end and intermediate annular shells 34 and 36, as well as the concentricity of the end and intermediate annular shells 34 and 36, are significantly improved over conventional machining methods. Consequently, the shell internal broach assembly 28 of this invention is capable of presenting a highly repeatable broaching configuration to a workpiece. In contrast, the shells 12 known in the prior art (FIGS. 1 and 2) are substantially longer, generally to provide a high length to diameter ratio for stability. However, the excessive lengths of such shells 12 prevent the use of travelling-wire EDM methods, resulting in less precise machining of the shells 12 and, therefore, less precise placement of the broaching inserts 16 relative to the arbor 10.

In addition, the shell internal broach assembly 28 of this invention promotes interchangeability and versatility in that the end and intermediate annular shells 34 and 36 may be readily replaced with other end and intermediate annular shells 34 and 36 having a different diameter and/or configuration, such as the number and/or positions of the broaching inserts 16.

Another significant advantage of this invention is that the use of the annular spacers 32 effectively reduces the cost of the shell internal broach assembly 28, in that the simple cylindrical outer surface of the annular spacers 32 is less expensive to manufacture than the slots 42 in the end and intermediate annular shells 34 and 36, which must be accurately formed to receive the broaching inserts 16. Furthermore, the number and length of the annular spacers 32 used can be varied in accordance with the strength required by the broaching inserts 16 to resist deformation by the cutting forces. The annular spacers 32 also provide the advantage of facilitating chip removal during the operation of the shell internal broach assembly 28, in that the space provided by the annular spacers 32 between adjacent end and intermediate annular shells 34 and 36 can accommodate the chips and swarf generated during the broaching process.

While the invention has been described in terms of a preferred embodiment, it is apparent that other forms could be adopted by one skilled in the art. For example, the size and number of end and/or intermediate annular shells 34 and 36, as well as the manner in which they are retained on the pulling arbor, could be varied from that shown in the Figures. Additionally, other styles of broaching inserts 16 could be used. Accordingly, the scope of the invention is to be limited only by the following claims.

What is claimed is:

1. A broach apparatus comprising:
    an arbor;
    a plurality of annular members disposed on said arbor, each of said plurality of annular members having a plurality of longitudinal slots located on its outer periphery, said plurality of annular members being aligned on said arbor so as to align each of said slots of said plurality of longitudinal slots and thereby define a plurality of segmented elongated slots extending substantially longitudinally along the outer periphery of said plurality of annular members disposed on said arbor;
    a plurality of annular spacers disposed on said arbor, at least one of said plurality of annular spacers being disposed between at least one adjacent pair of said plurality of annular members;
    at least one cutting insert mounted in each of said plurality of longitudinal slots located in the outer periphery of said plurality of annular members; and
    means disposed on said arbor for retaining said plurality of annular members and said plurality of annular spacers concentrically positioned relative to each other on said arbor.

2. The broach apparatus of claim 1 further comprising a plurality of shaving rings disposed at one end of said arbor so as to be substantially concentric with said plurality of annular members.

3. The broach apparatus of claim 1 further comprising:
    end mounting members disposed adjacent each end of said at least one cutting insert, said end mounting members securing said at least one cutting insert to at least two of said plurality of annular members; and
    an intermediate mounting member disposed between adjacent end mounting members on said at least one cutting insert, said intermediate mounting member securing said at least one cutting insert to at least one of said plurality of annular members.

4. The broach apparatus of claim 1 further comprising at least two inserts retained in said plurality of segmented elongated slots.

5. The broach apparatus of claim 4 wherein adjacent ends of said at least two said inserts are secured to one of said plurality of annular members.

6. An internal broach apparatus comprising:
    an arbor having an abutment, a threaded portion spaced apart from said abutment, and a cylindrical portion intermediate said abutment and said threaded portion;
    a plurality of annular members disposed on said cylindrical portion of said arbor, each of said plurality of annular members having a plurality of slots formed on its outer periphery, said plurality of annular members being aligned on said arbor so as to align said plurality of slots to define a plurality of segmented elongated slots extending substantially longitudinally along the outer periphery of said plurality of annular members disposed on said arbor;
    a plurality of annular spacers disposed on said cylindrical portion of said arbor so as to be substantially concentric with said plurality of said annular members, at least one of said plurality of annular spacers being disposed between at least one adjacent pair of said plurality of annular members;
    a plurality of inserts secured within said plurality of segmented elongated slots;
    means for securing said plurality of inserts in said plurality of segmented elongated slots; and
    means threadably mounted to said threaded portion for retaining said plurality of annular members and said plurality of annular spacers on said cylindrical portion of said arbor.

7. The internal broach apparatus of claim 6 wherein said plurality of annular spacers are interleaved with said plurality of annular members.

8. The internal broach apparatus of claim 6 further comprising a plurality of shaving rings disposed on said cylindrical portion adjacent said threaded portion of said arbor, said plurality of shaving rings being substantially concentric with said plurality of annular members.

9. The internal broach apparatus of claim 6 wherein said retaining means comprises a threaded nut.

10. The internal broach apparatus of claim 6 further comprising:
    end mounting members disposed adjacent each end of each of said plurality of inserts, said end mounting members securing said each of said plurality of inserts to at least two of said plurality of annular members; and
    an intermediate mounting member disposed between adjacent end mounting members on said each of said plurality of inserts, said intermediate mounting member securing said each of said plurality of inserts to at least one of said plurality of annular members.

11. The internal broach apparatus of claim 6 wherein at least two of said plurality of inserts are secured in each one of said plurality of segmented elongated slots.

12. The internal broach apparatus of claim 11 wherein adjacent ends of said at least two of said plurality of inserts are secured to one of said plurality of annular members.

13. An insert mounting assembly for an internal broach apparatus having an arbor, said arbor having an abutment, a threaded portion spaced apart from said abutment, and a cylindrical portion intermediate said abutment and said threaded portion, said internal broach apparatus supporting a plurality of inserts and including a threaded member mounted to said threaded portion, said insert mounting assembly comprising:
    a plurality of annular members disposed on said cylindrical portion of said arbor, each of said plurality of annular members having at least one slot formed on its periphery, said plurality of annular members being aligned on said arbor so as to align said at least one slot of each of said plurality of annular members so as to define at least one segmented elongate slot extending substantially longitudinally along said arbor, said at least one segmented elongate slot receiving at least one of said plurality of inserts;

means for securing said at least one of said plurality of inserts in said at least one segmented elongate slot; and a plurality of annular spacers disposed on said cylindrical portion of said arbor, at least one of said plurality of annular spacers being disposed between at least one adjacent pair of said plurality of annular members.

14. The insert mounting assembly of claim 13 wherein said plurality of annular spacers are interleaved with said plurality of annular members.

15. The insert mounting assembly of claim 13 wherein said at least one slot formed on the periphery of each of said plurality of annular members is a plurality of axial slots, said plurality of annular members being aligned on said arbor so as to align said plurality of axial slots and thereby define a plurality of segmented elongate slots extending substantially longitudinally along said arbor, at least one of said plurality of inserts being retained in each of said plurality of segmented elongate slots.

16. The insert mounting assembly of claim 13 further comprising:

end mounting members disposed adjacent each end of each of said plurality of inserts, said end mounting members securing said each of said plurality of inserts to at least two of said plurality of annular members; and an intermediate mounting member disposed between adjacent end mounting members on said each of said plurality of inserts, said intermediate mounting member securing said each of said plurality of inserts to at least one of said plurality of annular members.

17. The insert mounting assembly of claim 13 wherein at least two of said plurality of inserts are secured in each said at least one segmented elongate slot.

18. The insert mounting assembly of claim 17 wherein adjacent ends of said at least two of said plurality of inserts are secured to one of said plurality of annular members.

* * * * *

UNITED STATES PATENT AND TRADEMARK OFFICE
CERTIFICATE OF CORRECTION

PATENT NO. : 5,352,068
DATED      : October, 4, 1994
INVENTOR(S) : Robert E. Roseliep It is certified that error appears in the above-indentified patent and that said Letters Patent is hereby corrected as shown below:

```
        Title page, item [73], line 2, delete "Oceana County" insert ----
Macomb County ----.
```

Signed and Sealed this

Third Day of January, 1995

Attest:

BRUCE LEHMAN

Attesting Officer     Commissioner of Patents and Trademarks